United States Patent [19]

Lung

[11] Patent Number: 4,881,338

[45] Date of Patent: Nov. 21, 1989

[54] TELESCOPIC GAFF HOOK DEVICE

[75] Inventor: Jimmy R. Lung, Destin, Fla.

[73] Assignee: Destin Machine, Inc., Destin, Fla.

[21] Appl. No.: 267,800

[22] Filed: Nov. 7, 1988

[51] Int. Cl.$^4$ .............................................. A01K 97/14
[52] U.S. Cl. .......................................................... 43/5
[58] Field of Search ...................... 43/5, 6, 12; 16/115; 15/144 B; 294/19.3, 26; 403/334, 109; 138/120

[56] References Cited

U.S. PATENT DOCUMENTS

| | | | |
|---|---|---|---|
| 2,819,547 | 1/1958 | Clements | 403/109 |
| 3,922,027 | 11/1975 | Nesselt | 294/19.3 |
| 4,004,539 | 1/1977 | Wesson | 43/5 |
| 4,739,573 | 4/1988 | Robertson | 43/5 |

FOREIGN PATENT DOCUMENTS

| | | | |
|---|---|---|---|
| 695130 | 12/1930 | France | 294/26 |
| 181906 | 6/1922 | United Kingdom | 43/5 |

Primary Examiner—M. Jordan
Attorney, Agent, or Firm—Arthur G. Yeager; Earl L. Tyner

[57] ABSTRACT

Gaff hook device having a tubular body of a plurality of telescoping sections. At the butt end of the body there is a hand grip and at the tip end there is a hook fastened to the body so as to be nonrotatable. A removable protective cover over the pointed end of the hook is tethered to a keeper sleeve which slides over the shaft of the hook.

16 Claims, 2 Drawing Sheets

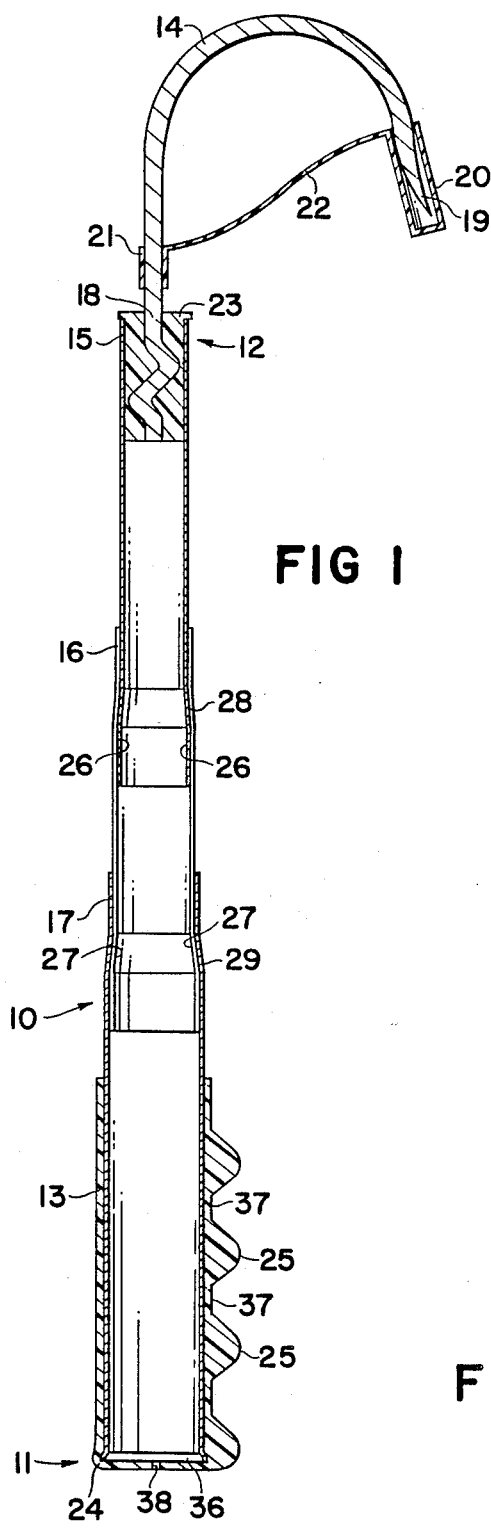
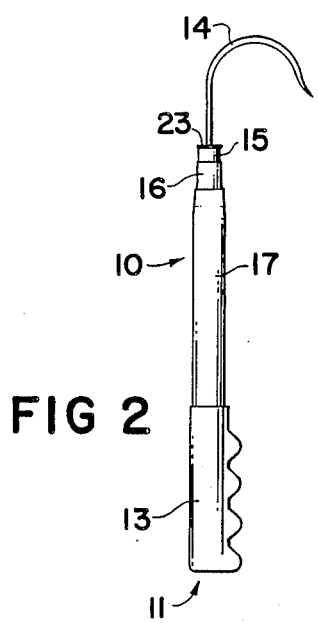
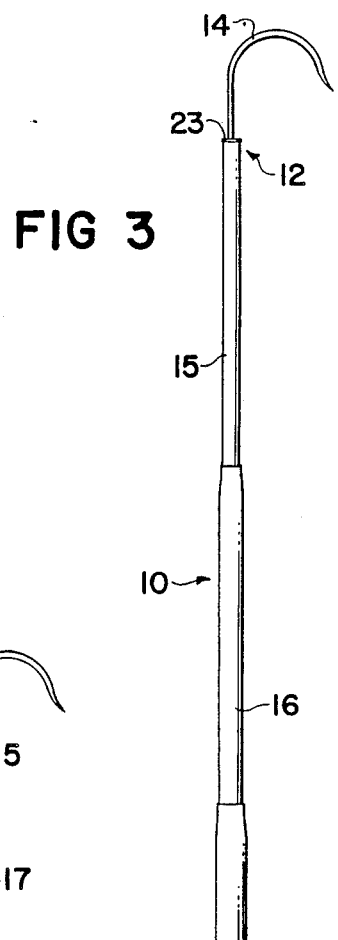

TELESCOPIC GAFF HOOK DEVICE

RELATED DOCUMENTATION

This invention is described in Disclosure Document No. 196852 filed July 14, 1988.

BACKGROUND OF THE INVENTION

Gaff hooks are well known devices for pulling fish out of the water or for catching onto other objects to pull them out of the water or to assist in berthing a boat by making a connection with a pier or a buoy and pulling the boat close enough to tie it up with a line. In most instances a gaff hook device is a stiff wooden handle, 3-6 feet in length, with a hook affixed to one end, and thereby is too awkward to be easily portable. The present invention is a gaff hook device that is small enough to be carried in one's pocket or in a tackle box or easily stored aboard a boat and yet can readily be lengthened to an appropriate size for normal use. Adjustable gaff hooks have not been known before now.

It is an object of this invention to provide a novel gaff hook device. It is another object of this invention to provide a gaff hook device that has a telescopic body permitting it to be lengthened or shortened. Still other objects will become apparent from the more detailed description which follows.

BRIEF SUMMARY OF THE INVENTION

This invention relates to a gaff hook for use in fishing comprising a tubular member having a plurality of telescoping sections extending from a butt end to a tip end, a hand grip at said butt end, and a hook at said tip end, said hook having a shank and a pointed end, said shank being firmly, nonrotatably fixed in said tip end.

In one specific embodiment of the invention there is included a safety cover for the point of the hook and the cover is tethered to a sliding ring around the shank of the hook. In another embodiment the shank of the hook is embedded in a plug in the tip of the telescoping tubular member. In still another embodiment the hand grip is molded to provide a ridged gripping contour for the fingers. In still another embodiment the device is assembled from round aluminum tubes tapered and flared and slidable such that the device in its collapsed state can be fully extended by a snappy casting motion of the arm holding the device causing it to extend telescopically to its full length and to be automatically clamped in that position by the flared end of a telescopic section jamming into the respective tapered end of the next adjacent section.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a longitudinal cross sectional view of the telescoping gaff hook device of this invention;

FIG. 2 is a side elevational view of the gaff hook of this invention in the collapsed state;

FIG. 3 is a side elevational view of the gaff hook of this invention in the extended state;

DETAILED DESCRIPTION OF THE INVENTION

Figure 4:
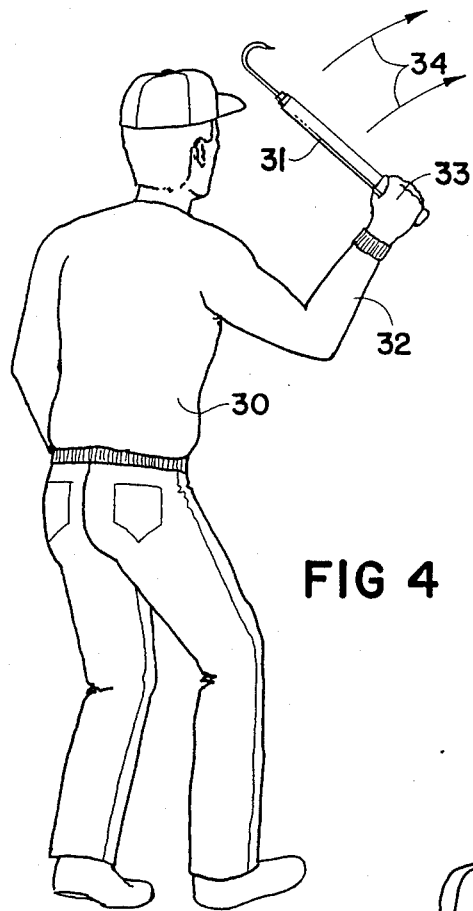
FIG. 4 is a schematic view of a person holding the gaff hook of FIG. 3 and ready to cast it forward to cause it to extend.

The invention can best be understood and appreciated by reference to the attached drawings. In FIG. 1 there is shown a cross section of the device so as to distinguish its component parts. The gaff hook device has a tubular body 10 of a plurality of telescoping sections, in this instance three sections, 15, 16, and 17. The body has a butt end 11 at the larger diameter of sections 15, 16 and 17, and a tip end 12 at the smaller diameter of sections 15, 16 and 17. Butt end 11 is covered with a hand grip 13 having a rounded end 24 that fits comfortably in the palm of the hand of the user. Preferably, handle grip 13 includes a ridged section contoured for finger gripping with ridges 25 between adjacent fingers and concave portions 37 between adjacent ridges 25 for each finger.

At the tip end 12 of the tubular body 10 is a gaff hook 14 fastened in such a way as to be nonrotatable with respect to body 10 when it is in its extended state and ready for use in hooking a fish or other object. One method of fastening hook 14 to tip end 12 is by embedding shank 18 of hook 14 in a plug 23 that fits tightly into the tip end 12 of the tubular body 10. A rubber plug or a plastic material which hardens on setting can be used for this purpose.

Body 10 is shown having three concentric tubular sections which nest together in a telescopic manner. The forward ends of sections 16 and 17 are tapered inwardly as at 28 and 29. Similarly, the rearward ends of sections 15 and 16 are flared outwardly as at 26 and 27. The tapers and flares are small enough in actual size to permit unrestricted sliding engagement between sections 15, 16 and 17 when in any position other than completely extended. When the sections 15, 16 and 17 are pulled to extend them to their maximum, flared end 27 of section 16 becomes jammed into the tapered forward end 29 of section 17. Similarly, flared end 26 of section 15 becomes jammed into tapered forward end 28 of section 16. If the match between the degree of taper and the degree of flare is correct, the extended body 10 becomes as firm as a solid non-telescopic tubular body. Generally, if the degree of taper and of flare is about 3°-5° from axial, the clamping action is most desirable. Smaller angles, e.g., 1°-2° clamp too tightly to be easily loosened; and larger angles, e.g., 6°-7° do not wedge sufficiently to provide a good clamp. Section 15 is not tapered at its forward end, because it receives plug 23 containing the embedded shank 18 of hook 14. The rearward end of section 17 is flared enough to provide a good seat for handle grip 13, but since it does not cooperate with any tapered forward end the amount of flare may not be the same as that of ends 26 and 27. It may be suitable not to flare the rearward end of section 17 to any substantial amount if grip 13 can be firmly attached to section 17 so as not to rotate about section 17.

All of the foregoing has been based on tubular body 10 being formed of three telescopic sections. This, of course, is not critical. Body 10 can be made of 2, 3, 4, 5 or more sections, particularly so if the extended length of body 10 is to be longer than is usual. In this invention it is considered normal for the collapsed length of the gaff hook device as shown in FIG. 2 to be about 12–15 inches so as to make it easy to carry in one's pocket or in a tackle box, in compartment aboard a boat, or other fisherman's equipment. When extended as shown in FIG. 3, gaff hook device should extend to about 30–35 inches overall length. If, of course, one wishes the device to be longer it would be easy to incorporate more than three sections or make each section longer. If one wanted the collapsed gaff hook device to be shorter, each section, whether there be 2, 3 or more sections, can be made shorter so as to collapse to a shorter overall length. Too many sections, however, generally cause the overall diameter of the body 10 to increase beyond a convenient size of about ¾ to 1½ inch which is comfortable in a normal size hand.

Figure 5:
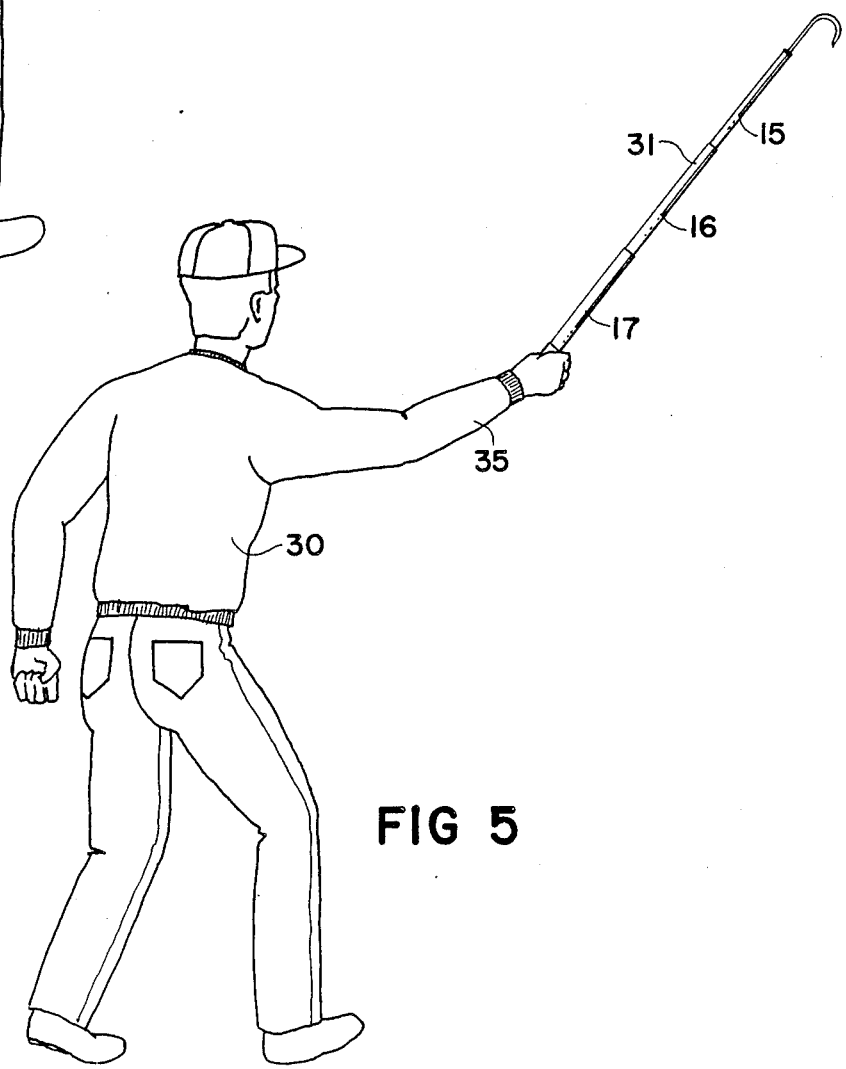
FIG. 5 is a schematic view of the person in FIG. 4 after casting the gaff hook device forward to cause it to extend.

In FIGS. 4 and 5 there is shown a desirable characteristic of the gaff hook of this invention when made in a convenient normal size as described above. A fisherman 30 may suddenly have need for a gaff hook but be busy with other matters. The collapsed gaff hook device 31 is grasped by the hand 33 and arm 32 is bent to bring the device to a somewhat vertical position as shown in FIG. 4. With a quick fling or snap of the arm after the fashion of casting with a fishing rod, the device is snapped forward causing it to extend with the weight of hook 14 carrying all sections 15, 16 and 17 (or more if available) to their extended position as seen in FIG. 5. This movement is sufficient to cause clamping between adjacent sections and to put the device 31 into an operable position for gaff hooking a fish. This ability to extend the gaff hook device by a throwing action of the arm 32 is desirable when quick action is needed to secure a lively fish.

It is preferable to include a vent hole 38 through the butt end of hand grip 13 so as to eliminate any momentary vacuum inside body 10 that might prevent the full extension of the gaff hook device when casting it forward as in FIG. 5.

A safety feature of this invention which is optional, but preferred is shown in FIG. 1 as a cover for the dangerous sharp point of hook 14. A long tubular cap 20 having an open end and a closed end is slidable over hook point 19. A keeper sleeve 21 is slidable over hook shank 18 and a tether 22 connects the cover 20 to the sleeve 21. Cover 20 is readily removed from hook point 19 when the hook is to be used. It can be removed by hand or merely by brushing the covered hook against a surface to slide the cover 20 away. Tether 22 will keep the cover 20 from being lost and allow cover 20 to be replaced when the hook is not in use.

Preferably the body 10 of the gaff hook device is made of aluminum tubing, round, square, or other cross-sectional shape. Plastic tubing is also usable for body 10, but it probably is more expensive and not more convenient than aluminum. Handle grip 13 and hook cover 20 are preferably made of plastic or rubber.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A gaff hook for use in fishing comprising a tubular member having a plurality of telescoping sections extending from a butt end to a tip end, a hand grip at said butt end, and a hook at said tip end, said hook having a shank and a point end, said shank being firmly, nonrotatably fixed in said tip end, a tubular cover having a closed end and an open end with open end slidable over said point of said hook a tubular keeper ring slidable over said shank of said hook and a tether member connected at one end to said cover and at the other end to said keeper ring.

2. The gaff hook of claim 1 wherein said shank is embedded in a plug and adapted to be nonrotatable with respect to said plug, said plug being inserted into and affixed in said tip end of said tubular member.

3. The gaff hook of claim 1 wherein said hand grip includes a body to fit in the palm of the hand of the user and an outside contour having a ridged portion adapted to fit between the fingers of the hand.

4. The gaff hook of claim 1 wherein each said telescoping section has tapered ends that mutually lock with the next adjacent sections that are radially larger or smaller.

5. The assembly of claim 4 wherein the angle of taper at each end is from 3°–5° so that said sections may become wedger by grasping said hand grip and flinging said gaff hook outwardly causing said sections to become wedged in their extended position.

6. The assembly of claim 1 wherein said hand grip includes a vent hole to permit air to freely pass therethrough and into said hollow of each said section.

7. A gaff hook assembly for use in fishing comprising a tubular body formed by a plurality of telescoping hollow sections each axially slidable concentrically inside of the next adjacent one of said sections from a collapsed position to a fully extended position, said body having a small tip end and an opposed large butt end, a hand grip telescopically connected over said butt end, a gaff hook having a shank portion telescopically connected with said tip end, said gaff hook having a free end directed generally toward said butt end, each said telescoping section being tapered at each end thereof to cooperate with a tapered end of an adjacent said section to releasably wedge said sections in a nonrotatable arrangement when extended, and in a freely rotatably concentrically aligned condition when collapsed, the angle of taper at each end being from 3°–5° so that said sections may become wedged by grasping said hand grip and flinging said gaff hook outwardly causing said sections to become wedged in their extended position.

8. The assembly of claim 7 further comprising a removable protective cover secured to said pointed free end, a keeper ring attached to said shank, a tether coupled between said cover on said gaff hook.

9. The assembly of claim 7 wherein said hand grip includes a vent hole to permit air to freely pass therethrough and into said hollow of each said section.

10. The assembly of claim 7 further comprising means for affixing said shank portion to said tip end to inhibit any rotation thereof.

11. The assembly of claim 7 wherein said hand grip includes a body to fit a palm of a hand of a user and a ripple portion adapted to accommodate the fingers of a hand.

12. The assembly of claim 1 wherein said hand grip includes a vent hole to permit air to freely pass therethrough and into said hollow of each said section.

13. A gaff hook for use in fishing comprising a round tubular aluminum body of a plurality of telescoping sections each axially slidable concentrically inside of or outside of adjacent said sections from a collapsed position to a totally extended position, said body having a large butt end on which is mounted a hand grip and a small tip end on which is mounted a gaff hook with a shank nonrotatably affixed to said body and a pointed end outside said body, each said telescoping section being tapered at each end thereof to cooperate with the tapered end of an adjacent said section to clamp said sections in a nonrotatable arrangement with extended, and in a freely rotatable condition when collapsed, said adjacent sections being automatically clamped by grasping said hand grip and flinging said gaff hook outwardly to cause said sections to be maintained in their extended position.

14. The assembly of claim 13 further comprising a removable protective cover secured to said pointed free end, a keeper ring attached to said shank, a tether coupled between said cover on said gaff hook.

15. The assembly of claim 13 wherein said hand grip includes a vent hole to permit air to freely pass therethrough and into said hollow of each section.

16. The assembly of claim 13 wherein said angle of taper at each end is 3°–5°.

* * * * *